(12) United States Patent
Fletcher et al.

(10) Patent No.: US 12,341,892 B2
(45) Date of Patent: *Jun. 24, 2025

(54) COMPUTER-IMPLEMENTED SYSTEMS AND METHODS RELATING TO A BINARY BLOCKCHAIN COMPRISING A PAIR OF COUPLED BLOCKCHAINS

(71) Applicant: nChain Licensing AG, Zug (CH)

(72) Inventors: John Fletcher, Cambridge (GB); Martin Sewell, London (GB)

(73) Assignee: NCHAIN LICENSING AG, Zug (CH)

( * ) Notice: Subject to any disclaimer, the term of this patent is extended or adjusted under 35 U.S.C. 154(b) by 111 days.

This patent is subject to a terminal disclaimer.

(21) Appl. No.: 18/121,545

(22) Filed: Mar. 14, 2023

(65) Prior Publication Data
US 2023/0283473 A1    Sep. 7, 2023

Related U.S. Application Data

(63) Continuation of application No. 16/638,675, filed as application No. PCT/IB2018/055992 on Aug. 9, 2018, now Pat. No. 11,616,649.

(30) Foreign Application Priority Data

Aug. 14, 2017 (GB) ..................... 1713031

(51) Int. Cl.
*H04L 9/32* (2006.01)
*G06F 16/27* (2019.01)
*H04L 9/00* (2022.01)

(52) U.S. Cl.
CPC ............ *H04L 9/3213* (2013.01); *G06F 16/27* (2019.01); *H04L 9/3218* (2013.01); *H04L 9/3239* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 11,616,649 B2 * | 3/2023 | Fletcher | H04L 9/3239 713/159 |
| 2017/0163733 A1 | 6/2017 | Grefen et al. | |

(Continued)

FOREIGN PATENT DOCUMENTS

| | | |
|---|---|---|
| CN | 106453377 A | 2/2017 |
| CN | 107222482 A | 9/2017 |

(Continued)

OTHER PUBLICATIONS

Bitfury Group "Proof of Stake versus Proof of Work" [online] Bitfury Group, 2015 [retrieved Sep. 24, 2021]. Retrieved from the Internet: URL: https://bitfury.com/content/downloads/pos-vs-pow-1.0.2.pdf (Year: 2015).*

(Continued)

*Primary Examiner* — Taghi T Arani
*Assistant Examiner* — Joshua Raymond White
(74) *Attorney, Agent, or Firm* — Tarolli, Sundheim, Covell & Tummino LLP

(57) ABSTRACT

There may be provided a computer-implemented method. The computer-implemented method includes: i) after a proof-of-stake token is transferred to an address of a determined type on a proof-of-stake blockchain, adding a record of the transfer of the proof-of-stake token to the proof-of-work blockchain; ii) identifying a node, from a group of nodes, to participate in adding a block to the proof-of-stake blockchain, the identifying based on the proof-of-work blockchain; and iii) including a block submitted by the identified node in the proof-of-stake blockchain.

15 Claims, 6 Drawing Sheets

(56) References Cited

U.S. PATENT DOCUMENTS

| | | | |
|---|---|---|---|
| 2017/0236123 A1 | 8/2017 | Ali et al. | |
| 2017/0338963 A1* | 11/2017 | Berg | H04L 9/3247 |
| 2019/0108364 A1* | 4/2019 | Roennow | G06Q 20/4037 |

FOREIGN PATENT DOCUMENTS

| | | |
|---|---|---|
| GB | 2549085 A | 10/2017 |
| WO | 2017162904 A1 | 9/2017 |
| WO | 2017167550 A1 | 10/2017 |

OTHER PUBLICATIONS

Neblio "Staking, Explained" [online] Neblio, Jul. 2, 2017 [retrieved Sep. 24, 2021]. Retrieved from the Internet: URL: https://bitfury.com/content/downloads/pos-vs-pow-1.0.2.pdf (Year: 2017).*

Kwon, Jae "Tendermint: Consensus without Mining" [online] Tendermint, 2014 [retrieved Sep. 24, 2021]. Retrieved from the Internet: URL: https://tendermint.com/static/docs/tendermint.pdf (Year: 2014).*

Chepurnoy, Alexander et al. "Twinscoin: A Cryptocurrency via Proof-of-Work and Proof-of-Stake" [online] IACR, Mar. 2017 [retrieved Sep. 24, 2021]. Retrieved from the Internet: URL: https://eprint.iacr.org/2017/232.pdf (Year: 2017).*

Kwon, Jae "Tendermint: Consensus without Mining" [online] Tendermint, 2014 [retrieved Sep. 24, 2021]. Retrieved from the Internet: URL: https://tendermint.com/static/docs/tendermint.pdf (Year: 2014) (Year: 2014).*

King, Sunny et al. "PPCoin: Peer-to-Peer Crypto-Currency with Proof-of-Stake" [online] Decred, Aug. 19, 2012 [retrieved Sep. 24, 2021] Retrieved from the Internet: URL: https://decred.org/research/king2012.pdf (Year: 2012).*

Chen, Jing et al. "Algorand" [online] Cornell University, May 26, 2017 [retrieved Sep. 24, 2021]. Retrieved from the Internet: URL: https://arxiv.org/pdf/1607.01341.pdf (Year: 2017).*

Anonymous, "Delayed Proof of Work (dPoW) Whitepaper," Komodo Platofrm, Aug. 30, 2016, https://www.komodoplatform.com/en/technology/whitepapers/Komodo_dPoW_Whitepaper_v1.pdf, 17 pages.

Anonymous, "Delayed Proof of Work (dPoW)," Komodo Platofrm Wiki, Jun. 18, 2017, https://wiki.komodoplatform.com/wiki/Delayed_Proof_of_Work_%28dPoW%29, 2 pages.

Antonopoulos, "Mastering Bitcoin—Unlocking Digital Cryptocurrencies," O'Reilly Media, Inc., Dec. 20, 2014, 282 pages.

Bitfury Group, "Proof of Stake versus Proof of Work White Paper Version 1.0," Bitfury Group, Sep. 13, 2015, https://bitfury.com/content/downloads/pos-vs-pow-1.0.2.pdf, 26 pages.

Bitfury Group, "Proof of Stake Versus Proof of Work," White Paper, Sep. 13, 2015, 26 pages.

Blueperrier et al., "Crazy idea: let's create a novel mechanism against 51% attack. See inside! [x-post /r/ dogecoindev]," Reddit, Apr. 8, 2014, https://www.reddit.com/r/dogecoin/comments/22kshx/crazy_idea_lets_create_a_novel_mechanism_against/, 6 pages.

Chen et al, "Algorand" Cornell University, Retrieved from the Internet: URL: https://arxiv.org/pdf/1607.01341.pdf, May 26, 2017, 75 pages.

Chepurnoy et al, "Twinscoin: A Cryptocurrency via Proof-of-Work and Proof-of-Stake" IACR, Mar. 2017 [retrieved Sep. 24, 2021 from https://eprint.iacr.org/2017/232.pdf], 2017.

Duong et al., "TwinsCoin: A Cryptocurrency via Proof-of-Work and Proof-of-Stake," Proceedings of the 2nd ACM Workshop on Blockchains, Cryptocurrencies, and Contracts, May 22, 2018, https://eprint.iacr.org/2017/232.pdf, 21 bages.

Fisher et al., "Proof of Proof: A Trustless, Permissionless, Decentralized, and Scalable Means of Inheriting Proof-of-Work Security," Veriblock, May 17, 2017, https://www.veriblock.com/wp-content/uploads/2017/02/POP-White-Paper-/1.0j.pdf, 20 pages.

International Search Report and Written Opinion mailed Oct. 18, 2018, Patent Application No. PCT/ B2018/055992, 11 pages.

King et al., "PPCoin: Peer-to-Peer Crypto-Currency with Proof-of-Stake," self-published paper, Aug. 19, 2012, https://ia601905.us.archive.org/1/items/PPCoinPaper/ppcoin-paper.pdf, 6 pages.

Kokoris-Kogias et al., "Enhancing bitcoin security and performance with strong consistency via collective signing," 25th Usenix Security Symposium 2016, Aug. 10, 2016, 19 pages.

Kwon, "Tendermint: Consensus without Mining," Darft v 0.6, Aug. 2014, https://tendermint.com/static/docs/tendermint.pdf, 11 pages.

Lerner, "Rsk Merge Mining (RMM) and Bitcoin Interoperability," RSK, Jun. 26, 2016, https://prints.oxs.cz/24/data/RSKMergeMiningandBitcoinInteroperability.pdf, 9 pages.

Micali et al., "ALGORAND: The efficient and democratic ledger," CoRR, abs/1607.01341 3(3):3-, May 2016, 75 pages.

Nakamoto, "Bitcoin: A Peer-to-Peer Electronic Cash System," Bitcoin, Oct. 31, 2008, https://bitcoin.org/bitcoin.pdf, 9 pages.

Neblio, "Staking, Explained, " Medium, Jul. 2, 2017, https://medium.com/neblio-blog/staking-explained-8c8d67f289c0, 6 pages.

Realbitcoin et al., "Are these BTC fixes feasible?," Bitcoin Forum, Jan. 6, 2017, https://bitcointalk.to/index.php? topic=1697981.0;prev_next=prev, 7 pages.

Satoshi et al., "Connection Limits," Bitcoin Forum, Aug. 9, 2010, https://bitcointalk.org/index.php?topic=741.0; prev_next=prev, 2 pages.

UK Commercial Search Report mailed Jan. 12, 2018, Patent Application No. GB1713031.1, 7 pages.

Veriblock, "Homepage," Veriblock, copyright 2017, https://web.archive.org/web/20170517172845/http://www.veriblock.com:80/, 7 pages.

* cited by examiner

COMPUTER-IMPLEMENTED SYSTEMS AND METHODS RELATING TO A BINARY BLOCKCHAIN COMPRISING A PAIR OF COUPLED BLOCKCHAINS

CROSS REFERENCE TO RELATED APPLICATIONS

This application is a continuation of U.S. patent application Ser. No. 16/638,675, filed Feb. 12, 2020, entitled "COMPUTER-IMPLEMENTED SYSTEMS AND METHODS RELATING TO A BINARY BLOCKCHAIN COMPRISING A PAIR OF COUPLED BLOCKCHAINS," which is a 371 National Stage of International Patent Application No. PCT/IB2018/055992, filed Aug. 9, 2018, which claims priority to United Kingdom Patent Application No. 1713031.1, filed Aug. 14, 2017, the disclosures of which are incorporated herein by reference in their entirety.

SUMMARY

This invention relates generally to distributed ledgers, and more particularly to methods and systems for providing a pair of coupled blockchains, which may collectively be referred to as a binary blockchain. The invention is particularly suited, but not limited to, achieving higher regularity in block creation and/or higher frequency block creation over traditional pure proof-of-work (POW) based blockchains while enhancing the security and reliability in comparison to pure proof-of-stake (POS) based blockchains. Thus, the invention provides secure, cryptographically enforced solutions for novel and advantageous blockchain implementations.

In this document we use the term 'blockchain' to include all forms of electronic, computer-based, distributed ledgers. These include, but are not limited to blockchain and transaction-chain technologies, permissioned and un-permissioned ledgers, consensus-based ledgers, shared ledgers and variations thereof. The most widely known application of blockchain technology is the Bitcoin ledger, although other blockchain implementations have been proposed and developed.

A blockchain is a consensus-based, electronic ledger which is implemented as a computer-based decentralised, distributed system made up of blocks which in turn are made up of transactions and other information. Bitcoin is an example of a proof-of-work blockchain in which miners perform expensive computations in order to facilitate transactions on the blockchain. Proof-of-work based blockchains have been criticized due to the large computing resources required, which require a large amount of power consumption to operate and also due to the fact that block-generation may be irregular and slow. Moreover, several blocks must be built on top of a given block before the given block is considered to be confirmed (i.e., sufficiently unlikely to be reverted).

Proof-of-stake based blockchains have been proposed as an alternative to proof-of-work blockchains. In a proof-of-stake blockchain network, the blockchain is secured by proof-of-stake rather than proof-of-work. Under proof-of-stake, miners hold a stake (deposit some tokens) in a special account. This stake may be referred to as a security deposit and the probability of being selected as the node to mine a block is proportional to the quantity of the digital assets provided as a security deposit. Proof-of-stake blockchain networks can be used to avoid the computational expense and energy required to mine on proof-of-work blockchains.

Further, proof-of-stake blockchains can allow for higher frequency and more regular block creation than proof-of-work blockchains. At least some proof-of-stake blockchains also have a low probability of forking and a block may be effectively confirmed as soon as it is added to the blockchain. However, a naïve implementation of proof-of-stake suffers from a "nothing at stake" problem. If there is a fork in the blockchain, a node's tokens may be duplicated across both parts of the fork (i.e., across competing blockchains). A miner that is randomly selected to create a block may create a block on both parts of the fork since it is easy for the miner to do so and since the miner would then receive a reward irrespective of which part of the fork prevails. Such equivocation would be detrimental to the security of the blockchain network since it would reduce the rate at which consensus can be achieved on a single blockchain and, therefore, prolong the time required before a transaction within a block can be considered confirmed.

Algorand is an example of a proof-of-stake blockchain network which purports to address the nothing at stake problem associated with proof-of-stake blockchains. In Algorand, to create a block, a committee is selected. More particularly, a leader (which may also be referred to as a proposer) and verifiers are self-selected from the set of all public keys by performing cryptographic sortation. The proposer proposes a block and the verifiers run a Byzantine consensus algorithm on behalf of the entire network to determine whether the block should be accepted. Micali, in proposing Algorand, (See Micali, S. (2016) Algorand: The efficient and democratic ledger. axXiv:1607.01341v9 (2017) [cs.CR]"Micali") demonstrated that, as long as more than two thirds of the tokens associated with the Algorand blockchain are held by honest users, the probability of a fork arising is negligible and the blockchain is secure. However, Algorand's security is conditional on ephemeral private keys being deleted after signing messages. Holders of such ephemeral private keys, however, have a personal economic interest in retaining such keys, making Algorand potentially vulnerable to attack. Further, the use of ephemeral keys introduces a computational expense.

It is desirable to improve blockchains to allow for high frequency and regular block creation as well as minimizing or eliminating forks without risking the security and reliability of the blockchain. Thus, it is desirable to provide improved methods, systems and devices which improve blockchain technology in one or more of these aspects.

The present invention is defined in the appended claims. Thus, in accordance with the present invention there is provided a method as defined in the appended claims.

As will be described in greater detail below, a binary blockchain may be provided. More particularly, two blockchains may be maintained. A proof-of-stake blockchain is used as a primary blockchain to allow nodes to have transactions of various types to be added to the primary blockchain. These transactions may enable the transfer of tokens between various nodes, may contain smart contract code, etc. Nodes may be eligible to create blocks on the primary blockchain by holding one or more tokens in a special type of repository associated with the primary blockchain (i.e., by holding "stake" in a special repository on the primary blockchain). The special repository may be referred to as an "account" hereafter for ease of reference, and this special type of account may also be referred to as a security deposit account.

A secondary blockchain is used in addition to the primary blockchain. The secondary blockchain is a proof-of-work blockchain and the secondary blockchain is used for more limited types of transactions than the primary blockchain. For example, the secondary blockchain may be used to record security deposits (i.e., proof-of-stake tokens) and/or balances associated with the security deposit accounts for the primary blockchain and such records on the secondary blockchain may be used to identify nodes that are eligible to create blocks (i.e., to mine) on the primary blockchain.

Transactions on the primary blockchain may occur with regularity and at a significantly higher frequency than on the secondary blockchain. The binary blockchain may provide enhanced security and reliability over pure proof-of-stake blockchains, such as Algorand, since the proof-of-work nature of the secondary blockchain addresses security concerns associated with the use of ephemeral keys.

Therefore, in accordance with the invention there may be provided a computer-implemented method. The method may be arranged to enable the coupling, combining, associating and/or linking of a plurality of blockchains or blockchain transactions which do not share the same underlying blockchain protocol e.g. a proof-of-stake protocol and a proof-of-work protocol.

The computer-implemented method includes: i) after a proof-of-stake token is transferred to an address of a determined type on a proof-of-stake blockchain, adding a record of the transfer of the proof-of-stake token to the proof-of-work blockchain; ii) identifying a node, from a group of nodes, to participate in adding a block to the proof-of-stake blockchain, the identifying based on the proof-of-work blockchain; and iii) including a block submitted by the identified node in the proof-of-stake blockchain.

In some implementations, identifying the node is performed deterministically according to predetermined criteria. The deterministic identification may be performed such that other nodes of a network identify a common node. In some implementations, the step of identifying is performed using cryptographic sortition.

In some implementations, the group of nodes includes at least some nodes that have transferred a proof-of-stake token to an address of the determined type but excludes nodes that have transferred a proof-of-stake token to an address of the determined type if a confirmation period associated with a recordation, on the proof-of-work blockchain, of the transfer of that proof-of-stake token has not yet elapsed.

In some implementations, the confirmation period is a predetermined number of blocks associated with the proof-of-work blockchain.

In some implementations, the block generates a new token and transfers control of the new token to a node that added the record of the transfer of the token to the proof-of-work blockchain.

In some implementations, the block generates a new token and transfers control of the new token to the identified node.

In some implementations, the computer-implemented method further includes identifying a withdrawal request issued by a node and excluding the node that issued the withdrawal request from the group of nodes.

In some implementations, the withdrawal request is identified from metadata of a transaction associated with the proof-of-work blockchain.

In some implementations, the computer-implemented method further includes, after an unbonding period associated with a withdrawal request, updating the proof-of-stake blockchain to return a proof-of-stake token associated with the withdrawal request to the node that issued the withdrawal request.

In some implementations, the unbonding period is a predetermined number of blocks associated with the proof-of-work blockchain.

In some implementations, the computer-implemented method further includes rejecting a block submitted by a node that is not the identified node.

In some implementations, the computer-implemented method further includes, prior to including the block in the proof-of-stake blockchain, verifying that the block has been validated by a group of validator nodes, the group of validator nodes being a subset of the group of nodes, the validator nodes being identified based on the proof-of-work blockchain.

In some implementations, the group of validator nodes are configured to perform a byzantine algorithm to validate the block.

In some implementations, the computer-implemented method further includes identifying a primary and secondary blockchain as a true copy of the primary and secondary blockchain by identifying the secondary blockchain containing the largest amount of work and comparing a distribution of proof-of-stake tokens from the identified secondary blockchain with a distribution of blocks mined in the primary blockchain.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In some implementations, the memory stores a binary blockchain comprising a proof-of-work blockchain and a proof-of-stake blockchain.

In accordance with the invention, there may be provided a computer readable storage medium. The computer readable storage medium includes computer-executable instructions which, when executed, configure a processor to perform a method described herein.

BRIEF DESCRIPTION OF DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Blockchain Network

Figure 1:
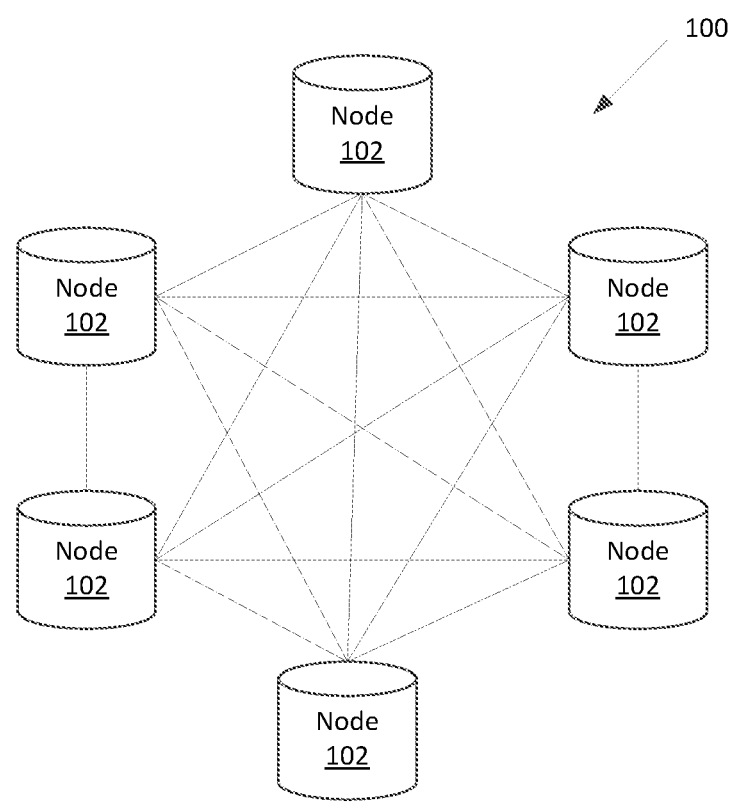
FIG. 1 illustrates a block diagram of an example binary blockchain network.

Reference will first be made to FIG. 1 which illustrates, in block diagram form, an example blockchain network 100 associated with a binary blockchain. The blockchain network 100 may be a public blockchain network, which is a peer-to-peer open membership network which may be joined by anyone, without invitation or without consent from other nodes. Distributed electronic devices running an instance of the blockchain protocol under which the blockchain network 100 operates may participate in the blockchain network 100. Such distributed electronic devices may be referred to as nodes 102. The blockchain protocol may be a binary blockchain protocol of the type described herein.

The electronic devices that run the blockchain protocol and that form the nodes 102 of the blockchain network 100 may be of various types including, for example, computers such as desktop computers, application specific integrated circuits (ASICs), laptop computers, tablet computers, servers, mobile devices such as smartphones, wearable computers such as smart watches or other electronic devices.

Nodes 102 of the blockchain network 100 are coupled to one another using suitable technologies. Such communication adheres to the protocol associated with the blockchain. More particularly, in the example, communication occurs in accordance with a binary blockchain protocol.

The nodes 102 maintain a binary blockchain, which is composed of two blockchains—a primary blockchain and a secondary blockchain. The primary blockchain is the blockchain on which the majority of transactions of the binary blockchain are recorded and any code they contain executed. For example, the primary blockchain may include blocks which include transactions that transfer control of a token from one node to another node and/or may include transactions that provide a smart contract. A token is a digital asset or other electronic or network resource and may, for example, represent control of a future computing resource or any other type of resource. A smart contract is a computer protocol that may be stored on the primary blockchain and executed by nodes in the blockchain network 100.

The primary blockchain is secured by proof-of-stake. That is, for a node to be eligible to add blocks to the primary blockchain (i.e. to "mine" a block), the node must provably hold certain tokens as "stake". These tokens may be referred to as a security deposit or security deposit tokens or proof-of-stake tokens since they are tokens associated with the proof-of-stake blockchain. The binary blockchain protocol only allows nodes that have placed a security deposit (i.e., a proof-of-stake token) into a special address (i.e., a security deposit address) to mine blocks on the primary blockchain. The address to which the deposit is made may be special in the sense that the address is of a predetermined or designated type. For example, the address may have a special flag, syntax, format, etc., that is used for addresses that are to hold security deposit tokens (i.e., proof-of-stake tokens), but that are not used for other addresses that are used to hold tokens for other purposes. Nodes that have deposited a security deposit on the primary blockchain may be permitted to act as miners on the primary blockchain provided other criteria are met (e.g., they have not requested withdrawal of their security deposit (i.e., their proof-of-stake tokens previously deposited).

The secondary blockchain differs from the primary blockchain in a number of aspects. For example, the secondary blockchain is secured by proof-of-work. That is, nodes 102 may act as miners of the secondary blockchain by performing expensive computations in order to facilitate transactions on the secondary blockchain. For example, the proof-of-work secondary blockchain may require miners to solve a cryptographic problem. For example, a miner of the secondary blockchain may find a nonce such that a block header hashes, with SHA-256, to a number that is less than a value defined by the current difficulty. The hashing power required for the proof-of-work algorithm means that a transaction is considered practically irreversible after a certain number of blocks have been mined on top of it. A node who solves the cryptographic problem creates a new block for the secondary blockchain and broadcasts the new block to other nodes 102. The other nodes 102 verify that the miner 104 has, in fact, solved the cryptographic problem and has, therefore, demonstrated sufficient proof-of-work before accepting that the block should be added to the secondary blockchain. The block is added to the secondary blockchain by consensus of the nodes 102.

The secondary blockchain may also differ from the primary blockchain in that the secondary blockchain has less frequent block-creation than the primary blockchain. As will be described in greater detail below, the binary blockchain protocol configures nodes to only include limited transactions on the secondary blockchain. For example, not every transaction on the primary blockchain is duplicated on the secondary blockchain. Rather, the binary blockchain protocol configures nodes to use the secondary blockchain for limited purposes. The secondary blockchain may record security deposit account balances.

One or more tokens may be provided to a miner of the secondary blockchain as a reward for the successful mining of a block on the secondary blockchain. Since the secondary blockchain is a limited-use blockchain, the reward may be made on the primary blockchain. That is, a number of tokens may be added to an account on the primary blockchain that is controlled by the node who mined a block on the secondary blockchain, as a reward for mining that block; this updating of the account balance on the primary blockchain may only occur once the relevant block on the secondary blockchain has been confirmed. Further, transaction fees may be lower on the primary blockchain due to the higher capacity of the primary blockchain.

Figure 2:
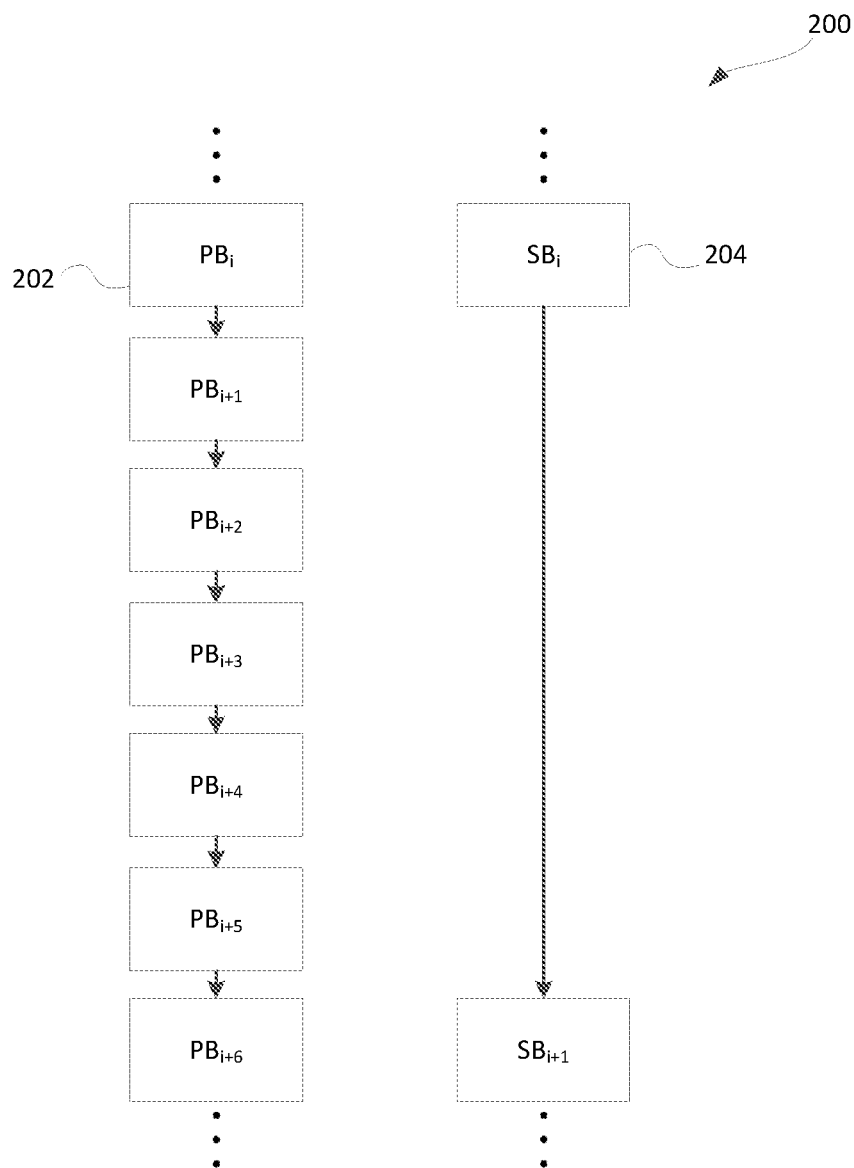
FIG. 2 illustrates a block diagram of an example binary blockchain.

Referring now to FIG. 2, an example binary blockchain 200 is illustrated. The binary blockchain 200 includes both a primary blockchain 202 and a secondary blockchain 204. As illustrated in FIG. 2, the primary blockchain 202 includes more blocks per unit time than the secondary blockchain 204 because it generates blocks at a higher frequency than the secondary blockchain and also because, in some implementations, blocks in the primary blockchain may (with overwhelming probability) be considered confirmed as soon as they appear. That is, the primary blockchain may be configured such that it does not fork. The primary blockchain 202 is used to record the majority of transactions (and, in at least some embodiments, all transactions), while the secondary blockchain 204 is only used to record deposit account balances and reward information (for example, block rewards for blocks mined on the secondary blockchain). For example, in a time period represented in FIG. 2, the primary blockchain adds seven blocks, denoted $PB_i$ through $PB_{i+6}$ while the secondary blockchain adds two secondary blocks, denoted $SB_i$ and $SB_{i+1}$. These numbers are used only for the purpose of illustration and the number of blocks in the primary and/or secondary blockchain may be different than that illustrated in FIG. 2. The blocks of the primary blockchain 202 may be referred to as primary blocks (PB) while the blocks of the secondary blockchain 204 may be referred to as secondary blocks (SB).

The primary blockchain 202 allows for immediate confirmation and high-frequency block creation so that general transactions may occur at a high rate, while the secondary blockchain 204 prevents forking of the primary blockchain 202 by securing (using proof-of-work) a record of the security deposits made by prospective miners of the primary blockchain 202.

Electronic Device Operating as a Node

Figure 3:
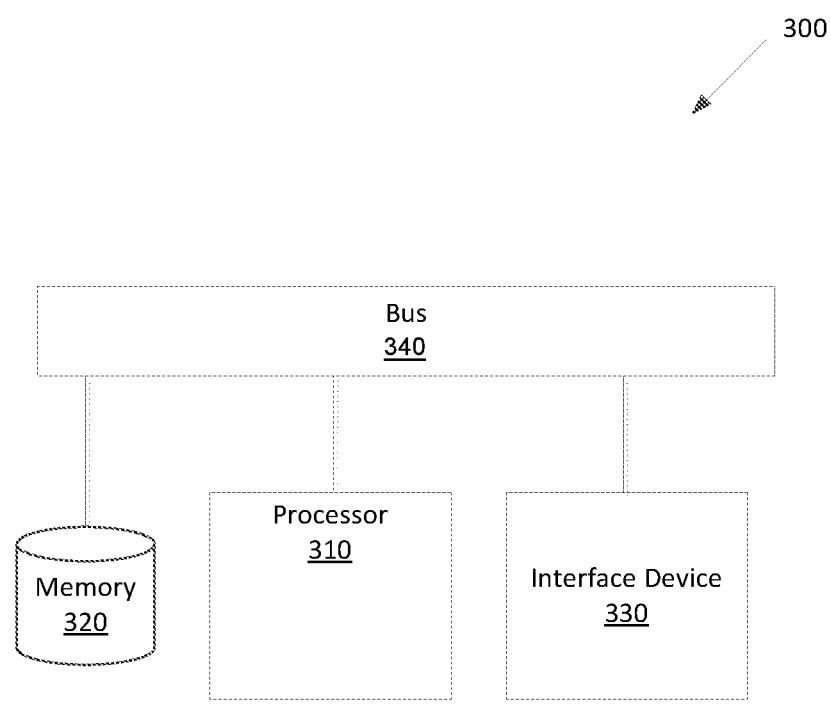
FIG. 3 illustrates a block diagram of an example electronic device that may function as a node.

FIG. 3 is a block diagram illustrating components of an example electronic device 300 which may serve as a node 102 (FIG. 1) in a binary blockchain network 100 (FIG. 1). The example electronic device 300 may also be referred to as a processing device. The electronic device may take various forms including, for example, a desktop computer, laptop computer, tablet computer, server, mobile device such a smartphone, wearable computer such as a smart watch, or a form of another type.

The electronic device 300 includes a processor 310, a memory 320 and an interface device 330. These components may be coupled directly or indirectly to one another and may communicate with one another. For example, the processor 310, memory 320 and interface device 330 may communicate with each other via a bus 340. The memory 320 stores a computer software program comprising machine-readable instructions and data for performing functions described herein. For example, the memory may include processor-executable instructions which, when executed by the processor 310, cause the electronic device to perform a method described herein. The processor-executable instructions may include instructions which, when executed by the processor 310, cause the electronic device to implement a binary blockchain protocol associated with the blockchain network 100 (FIG. 1).

The processor 310 may, for example, be implemented as an application specific integrated circuit (ASIC).

The memory 320 may store the primary blockchain 202 and/or the secondary blockchain 204 or a portion thereof. That is, the memory 320 may store all blocks of the primary and secondary blockchains or a portion of the blocks, such as the most recent blocks, or a portion of the information in some blocks.

While the memory 320 is illustrated with a single block in FIG. 3, in practice the electronic device 300 may include multiple memory components. The memory components may be of various types including, for example, RAM, HDD, SSD, flash drives, etc. Different types of memory may be suited to different purposes. Further, while the memory 320 is illustrated separately from the processor 310, the processor 310 may include embedded memory.

The electronic device 300 acts as a node 102 (FIG. 1) in the binary blockchain network 100 (FIG. 1). The electronic device 300 may perform various functions of the binary blockchain protocol such as, for example, validating blocks submitted by other nodes, proposing blocks for addition to the primary or secondary blockchains, etc.

Binary Blockchain Protocol

The nodes 102 of the binary blockchain network 100 are configured to operate according to a binary blockchain protocol. The binary blockchain protocol defines a rule set governing activities of the binary blockchain protocol. Nodes will evaluate whether other nodes have complied with the binary blockchain protocol; for example, by validating blocks submitted by other nodes of the binary blockchain network. A processor associated with one or more of the nodes may be configured with computer-executable instructions that configure the processor to operate according to the binary blockchain protocol.

According to the binary blockchain protocol, for a node to be eligible to "mine" blocks to a primary blockchain (i.e., in order to be able to submit a block for addition to the primary blockchain that will be accepted by other nodes in the binary blockchain network), the node must first place a security deposit (i.e., a proof-of-stake token) in a special account which may be referred to as a security deposit account. The security deposit is one or more tokens (which may be referred to as a deposit token or proof-of-stake token) and the special account may be an account that has an address of a determined type. For example, certain accounts associated with the blockchain network may be security deposit accounts and other accounts may be regular (i.e., non-deposit) accounts. Security deposit accounts may be accounts that are used only to hold the stake of a miner node for the primary blockchain while regular accounts may be used for other purposes. The binary blockchain protocol may require that every miner of the primary blockchain hold one or more tokens in their deposit account and, to become a miner of the primary blockchain, a node may transfer tokens from a regular deposit account to a security deposit account.

As will be described below, according to the binary blockchain protocol, once a block which includes a record of a transfer of a security deposit (i.e., of at least some proof-of-stake tokens) to a security deposit account has been added to the primary blockchain, a node executing the binary blockchain protocol is configured to have a record of the transfer of the security deposit (i.e., the proof-of-stake tokens transferred to the security deposit account) added to the secondary blockchain. The node adding the record of the transfer of the security deposit to the secondary blockchain may be a node mining the secondary blockchain. The status of security deposit accounts is, therefore, tracked on the secondary blockchain, which is a proof-of-work blockchain.

Before a node is eligible to mine on the primary blockchain following their transfer of a security deposit (i.e., at least some proof-of-stake tokens) to a security deposit account, a confirmation period must first elapse. The confirmation period is long enough so that the risk of a reorganization on the proof-of-work (i.e., secondary) blockchain is small. More precisely, the confirmation period is long enough so that a reorganization to the depth of the secondary blockchain where the security deposit is recorded is small. The confirmation period may be a certain number of blocks associated with the secondary blockchain. That is, the confirmation period may be said to have elapsed when a certain number of blocks have been added to the secondary blockchain on top of the block that included the record of the transfer of the security deposit. Once the confirmation period has elapsed, the transaction that records the transfer of the security deposit is said to be confirmed in the secondary blockchain, and the owner of this security deposit is then eligible to mine blocks on the primary blockchain.

As noted above, a special account (i.e., a security deposit account) may be an account that has an address of a determined type. For example, security deposit account addresses may include a flag or identifier that is not used for regular accounts and which indicates the status as a security deposit account.

The binary blockchain protocol may be configured to apply different rules to security deposit accounts and regular accounts. For example, tokens held in a regular account may be transferred to other accounts immediately upon authorization by the account-holder. However, tokens held in a security deposit account may only be transferred away after a withdrawal request has been issued and an unbonding period associated with the withdrawal request has elapsed. The unbonding period is a predefined number of blocks on the secondary blockchain. The length of the unbonding period is selected so that forks of this length (in the secondary blockchain) occur with negligible probability.

Accordingly, deposit tokens held in a security deposit account are only returned to the depositor node when the unbonding period following the withdrawal request has elapsed.

After a node has deposited a security deposit to an associated security deposit account on the primary blockchain and the secondary blockchain has been updated to reflect the security deposit account status (i.e., after a record of the transfer of the security deposit has been confirmed on the secondary blockchain), that node is eligible to mine on the primary blockchain until a withdrawal request, requesting return of the security deposit to a regular account, is received from that node. When the node is eligible to mine, they may be considered to be included in a group of nodes that are eligible to mine and the probability of a given node of the group being selected to mine a block may be proportional to the amount of security deposit deposited by that miner (i.e., the amount of proof-of-stake tokens held in a security deposit account for that miner) relative to the total amount of security deposit deposited by the group. Accordingly, a node depositing a larger amount of security deposit (e.g., more proof-of-stake tokens) has a higher chance of being selected as a miner of the primary blockchain than a node depositing a lower amount of security deposit.

Thus, eligibility to mine on the primary blockchain (i.e., to create blocks and have those blocks accepted by other nodes) is based on the amount of security deposit held. A greater security deposit increases the odds that a given node will be selected as miner, but all nodes having deposited stake (i.e., holding a security deposit in a security deposit account) have a chance at being chosen to mine any given block. Selection of a miner may be said to operate by lottery for the primary blockchain.

Any node of the binary blockchain network 100 may be eligible to mine on the secondary blockchain, even if they have not deposited a security deposit (i.e., if they have not transferred any proof-of-stake tokens to a special security deposit account). Since the secondary blockchain is a proof-of-work blockchain, entitlement to mine on the secondary blockchain arises from providing proof-of-work. That is, any node may create a block for the secondary blockchain and may prove to the other nodes of the secondary blockchain that they are entitled to mine the new block by proving that they have successfully solved a cryptographic puzzle.

Miners of the primary blockchain may be entitled to create a reward on the primary blockchain. For example, a miner that mines a block onto the primary blockchain may create a new token and other nodes will accept that the new token is valid if they determine that the miner has acted in accordance with the binary blockchain protocol. Miners of the secondary blockchain may also be entitled to create or otherwise receive a reward and they may be rewarded on the primary blockchain. For example, a miner of the secondary blockchain may be rewarded with new tokens created (by another node acting as a miner on the primary blockchain or by the node that mined onto the secondary blockchain and that also mines on the primary blockchain) on the primary blockchain.

In some implementations, block mining rewards, in the form of new tokens, may not be provided to miners of the primary blockchain. Instead, miners may receive only transaction fees from nodes having transactions included in a block created by such miners.

Validator nodes and/or miner nodes will confirm that the binary blockchain protocol is adhered to. That is, breaches of the protocol described above will be detected by miners (who validate transactions before including them in a block) and/or non-mining validator nodes (who may also validate transactions and blocks before including them in a blockchain). Thus, the nodes of the binary blockchain network 100 are configured to, prior to accepting that a block should be added to the primary blockchain or the secondary blockchain, ensure that the binary blockchain protocol has been adhered to. For example, the nodes may determine whether a block created for the primary blockchain was created by a miner eligible to mine (e.g., a node that 1) deposited stake; 2) had a record of the deposit of stake (a security deposit) added to the secondary blockchain and confirmed on the secondary blockchain; and 3) did not yet issue a withdrawal request to attempt to reclaim their security deposit). The nodes may also determine whether the node that submitted the block for addition to the primary blockchain is the node that is eligible to act as the miner.

A block created by an ineligible miner or a block created in violation of other rules of the binary blockchain protocol will be rejected by other nodes of the binary blockchain network 100.

Figure 4:
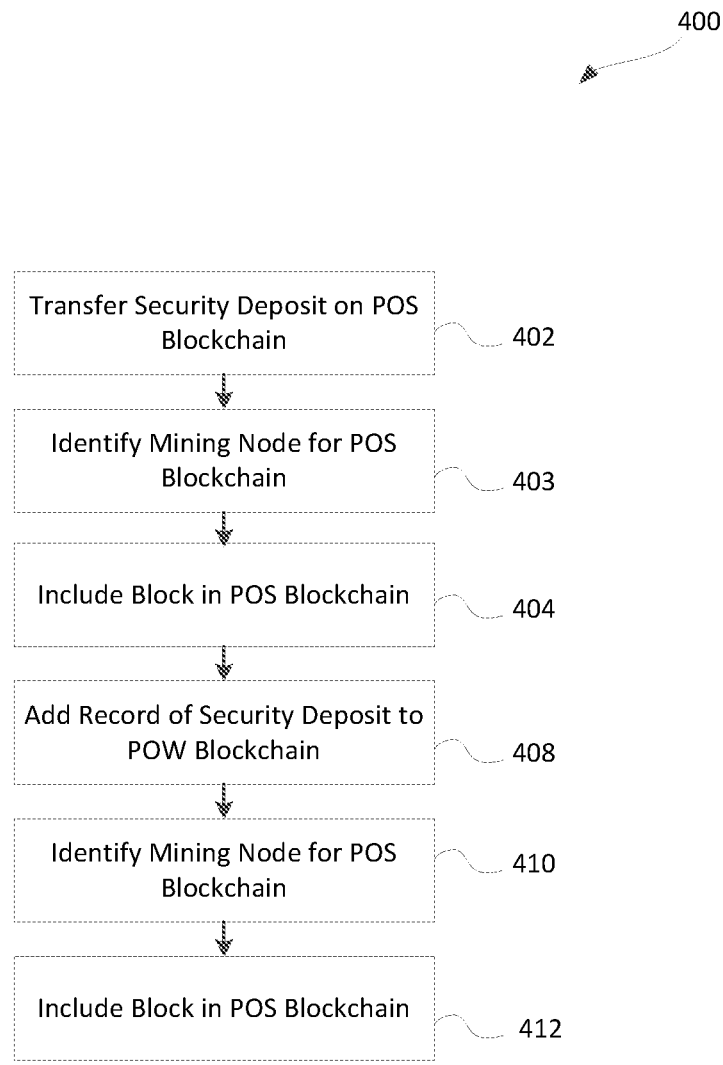
FIG. 4 is a flowchart of an example method performed in accordance with a binary blockchain protocol.

Reference will now be made to FIG. 4 which illustrates an example method 400 that may be performed by a node 102 operating in accordance with the binary blockchain protocol. The method 400 of FIG. 4 may be a computer-implemented method performed by a node 102 of the binary blockchain network 100. For example, a processor of the node 102 may be configured with computer-executable instructions (i.e., processor-executable instructions) which, when executed by the processor, configure the processor to perform the method 400 of FIG. 4.

At operation 402 of the method 400, the node 102 performing the method 400 may transfer a security deposit (i.e., may transfer one or more proof-of-stake tokens) to a security deposit account or may detect that another node has transferred a security deposit to a security deposit account. That is, the node 102 may transfer a security deposit (i.e., may transfer one or more proof-of-stake tokens) from a regular account to an address of a predetermined type which is associated with security deposit accounts, or may detect such a transfer made by another node. The transfer is made on the primary blockchain, which is a proof-of-stake blockchain. The transfer is made when a transaction, $T_p$, transferring the security deposit from a regular account to the deposit account is included in a block that is added to the primary blockchain. The transaction, $T_p$, may have been prepared by the node performing the method 400 or by another node. The transaction may then be included in a block generated by a node acting as a miner for the primary blockchain.

The node that generates the block that includes the transaction, $T_p$, is a node that is eligible to mine and a node that may be assigned the opportunity to generate the block through cryptographic sortition. Eligibility to mine will be discussed in greater detail below, in particular with reference to FIG. 5. Among the group of nodes that are eligible to mine, a single node may effectively be identified (at operation 403) as the node that is entitled to mine a given block through a process referred to as cryptographic sortition. During cryptographic sortition, nodes are identified to participate in adding a block to the proof-of-stake blockchain. Such identification is performed deterministically according to predetermined criteria such that other nodes of the binary blockchain network are all able to identify a common node. For example, during cryptographic sortition, one or more nodes are selected at random from the group of nodes that are eligible to mine. More particularly, a leader is identified using a cryptographic function on public data such a previous block. A verifier set may also be selected using cryptographic sortition; e.g., using a cryptographic function on public data such as a previous block. Cryptographic sortition is described in Micali, S., Algorand: The Efficient and Democratic Ledger. axXiv:1607.01341v9 (2017) [cs.CR], the contents of which are incorporated herein by reference.

The identified leader may be referred to as a miner since the leader proposes a new block that is to be mined.

The identification of the miner (at operation 403) and the validator set may be performed in the manner similar to that described by Micali, but the group of eligible miners is limited. For example, the method 500 of FIG. 5 may be performed at operation 403 to determine whether a particular node is included in a group of nodes that are eligible to mine. More specifically, the group of eligible miners includes only nodes that 1) deposited a security deposit (i.e., that transferred one or more proof-of-stake token to a special deposit account); 2) had a record of the security deposit added to the secondary blockchain and confirmed on the secondary blockchain; and 3) did not yet issue a withdrawal request to attempt to reclaim the security deposit (i.e., to attempt to have any proof-of-stake tokens deposited to a security deposit account transferred back to a regular account). At least some nodes that hold tokens in regular accounts may be ineligible to act as miners for the primary blockchain.

Moreover, in identifying the nodes that are to participate in adding the block to the primary blockchain, reference is made to the secondary blockchain. That is, holding a security deposit in the form of proof-of-stake tokens in the security deposit account on the primary blockchain is insufficient for eligibility to mine on the primary blockchain; the secondary blockchain must also indicate that the security deposit has been made (and the block in which this indication resides must have been confirmed). Thus, at the time when operation 403 is performed, the node that transferred the security deposit at operation 402 is not yet included in the group of nodes that are eligible to mine (since the secondary blockchain is only updated to reflect the transfer of the security deposit at subsequent operations of the method 400). If the node performing the method 400 were to detect a block created by a node that transferred a token to a security deposit account on the primary blockchain, the block would be rejected as being proposed by an ineligible node if the secondary blockchain had not yet been updated to record the transfer (or if the block containing the record is not yet confirmed).

Operation 403 may be performed, for example, as part of a validation operation by the node 102 performing the method 400 when determining whether to accept a block to the primary blockchain. If the block successfully validates (e.g., if the block is submitted by the node identified at operation 403), then the block may be included in the primary blockchain. For example, the node performing the method may add the block (at operation 404) to a copy of the primary blockchain stored at the node 102 performing the method.

After the security deposit (i.e., the proof-of-stake token(s)) is transferred to a security deposit account on the primary blockchain, a record of the security deposit may be added to the secondary blockchain at operation 408. For example, a node (who may be a miner of the secondary blockchain that is monitoring the primary blockchain) may prepare a record of the transfer of the security deposit and may add the record to a block of the secondary blockchain. The node that transferred the security deposit is eligible to mine on the primary blockchain only after the record has been confirmed on the secondary blockchain. That is, the node is eligible to mine after a confirmation period associated with the recordation on the proof-of-work blockchain has elapsed. The confirmation period is a predetermined number of blocks associated with the secondary blockchain. More specifically, the confirmation period is a period after which the possibility of a reorganization to the depth of the record of the security deposit on the secondary blockchain occurring becomes acceptably small. Due to the proof-of-work nature of the secondary blockchain, after a defined number of blocks have been added on top of the block that included the record the record becomes effectively irreversible. In order to ensure that the record of the transfer of the security deposit has been immutably added to the secondary blockchain, the nodes of the binary blockchain network may require that the confirmation period elapse before the node associated with the security deposit is eligible to mine on the primary blockchain.

The miner that makes a record of the placing of the security deposit in the block of the secondary blockchain may be the node performing the method 400 of FIG. 4 or may be another node in the binary blockchain network 100. Where the node performing the method 400 does not add the record of the placing of the security deposit to the block of the secondary blockchain or generate a block that includes the record, the node performing the method 400 may nevertheless take part as a validator, ensuring that the record is properly included in the block and/or that the block was properly generated (e.g., that the proof-of-work submitted by the miner to prove that the miner is entitled to generate the block is valid).

After the record of the placing of the security deposit has been added to the secondary blockchain and after a confirmation period has elapsed, the node that transferred the security deposit in the transaction, $T_p$, at operation 402 is eligible to participate in block generation for the primary blockchain. Accordingly, at operation 410, a further block may be added to the primary blockchain and, in adding the further block, a further node may be identified from a group of nodes that are eligible to participate as miners. Operation 410 may be performed similarly to operation 403, except that the node that transferred the security deposit at operation 402 is now eligible to participate at operation 410 since the record of the placing of the security deposit has now been added to the secondary blockchain and confirmed. To identify a node that is to participate in adding a block on the primary blockchain (such as the mining node and/or nodes of the validator set), cryptographic sortition may again be performed. At operation 410, however, cryptographic sortition is performed based on different public data than at operation 403 so that a different node is likely to be selected at operation 410. In identifying a node at operation 410, the node performing the method 400 refers to the secondary blockchain to ensure that the secondary blockchain indicates that the identified node has a security deposit in place on the primary blockchain and that this has been recorded in the secondary blockchain and the block in which it has been recorded has been confirmed. Thus, the identification at operation 410 is based, at least in part, on the proof-of-work blockchain.

In identifying a node at operation 410, the node 102 performing the method 400 may identify a group of eligible nodes or may determine whether a given node is included in a group of eligible nodes. For example, the method 500 of FIG. 5 may be performed at operation 410.

As noted above, the group of eligible nodes includes at least some nodes that have transferred a security deposit to an address of the determined type (e.g., to a security deposit account) but excludes nodes that have transferred a security deposit to an address of the determined type if a confirmation period associated with a recordation, on the proof-of-work blockchain, of the transfer of that security deposit has not yet elapsed. The confirmation period may be a predetermined number of blocks associated with the proof-of-work blockchain.

At operation 412, the node 102 performing the method 400 includes a block submitted by the identified node in the primary blockchain. For example, the node performing the method may add the block to a copy of the primary blockchain stored at the node 102 performing the method.

While not illustrated in FIG. 4, other nodes that are not the identified node for a given iteration of block creation may attempt to create a block. The node performing the method is configured to reject a block submitted by a node that is not the identified node for a given iteration of block creation.

Furthermore, while not illustrated in FIG. 4, before including a block in the primary blockchain, the node performing the method may verify that the block has been validated by a group of validator nodes, which may be referred to as a Byzantine agreement (BA) validator set. The group of validator nodes may be a subset of the group of nodes that are eligible to mine and the group of nodes that are eligible to mine may be identified based on the secondary blockchain. That is, nodes are only eligible for inclusion in the BA validator set if they: 1) deposited a security deposit; 2) had a record of the security deposit added to the secondary blockchain and confirmed on the secondary blockchain; and 3) did not yet issue a withdrawal request to attempt to reclaim the deposited security deposit.

The BA validator set may operate similar to Micali (2017) and may, for example, perform a byzantine algorithm to validate a block. That is, only the members of the BA validator set take part in the byzantine algorithm.

The binary blockchain protocol may allow nodes that create blocks (i.e., nodes that act as miners) to generate a new token and to transfer control of that new token to themselves. For example, the block that is included in the primary blockchain at operations 404 or 412 may include a reward for the node that mined that block. Provided the reward meets predefined criteria (such as criteria regarding the quantum of the reward), the reward will not prevent other nodes from validating the block. The other nodes may, however, evaluate the reward (e.g., the quantum of the reward) when validating the block.

Since the secondary blockchain is used for the limited purpose of public data recordation, miners of blocks on the secondary blockchain may receive rewards on the primary blockchain due to their mining on the secondary blockchain. For example, a block added to the primary blockchain (such as the block added at operation 404 or 412) may generate a new token and transfer control of the new token to a node that mined on the secondary blockchain. For example, the control of the new token may be transferred to the node that added the record of the transfer of the security deposit to the secondary blockchain. Optionally, the binary blockchain protocol may require that new tokens created on the primary blockchain as a reward for mining activity on the secondary blockchain may only be created by the node receiving the reward. This provides further incentive to deposit a significant stake on the primary blockchain and would reduce the incentive for miners on the primary blockchain to participate in a coordinated attack on the binary blockchain network because this would degrade the value of their stake. The binary blockchain protocol could also be varied so that only a portion of a reward for mining activities on the secondary blockchain could be generated in any given block mined on the primary blockchain. This would require miners to only claim a fraction of their reward at any given time and could reduce the incentive for smaller miners on the primary blockchain to exchange tokens specifically for the purpose of claiming block rewards after they have successfully mined on the secondary blockchain. Further, limiting reward redemption in this way may also create an effective floor for the amount of a security deposit that will be placed by a rational miner mining on the secondary blockchain. A miner of the secondary blockchain might earn secondary blockchain block rewards at a rate which is faster than they can claim them on the primary blockchain if they have insufficient security deposit. A rational miner may therefore place a security deposit that is sufficiently large relative to their hashing power on the secondary blockchain.

Figure 5:
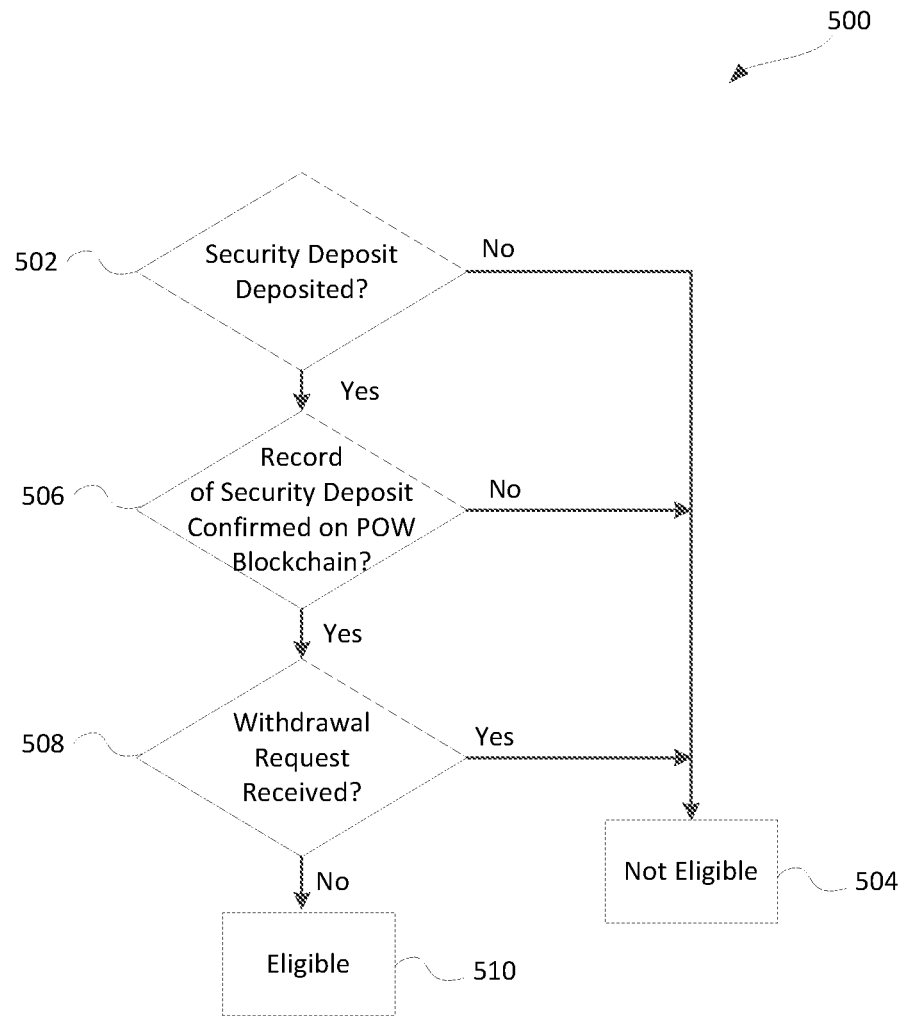
FIG. 5 is a flowchart of an example method of confiscating a digital asset.

Referring now to FIG. 5, an example method 500 of determining whether a candidate node is eligible to participate in the creation of a block (e.g., to mine) on a primary blockchain is illustrated. The candidate node may, for example, be a node that has proposed a block to be added to the primary blockchain and that, in doing so, claimed to be eligible to do so. The method 500 may, therefore, be performed as part of a validation or verification process before accepting the block onto the primary blockchain. The method 500 may be performed, for example, at operations 403 and/or 410 of the method 400 of FIG. 4. The method may be performed by a node on a binary blockchain network, such as the node 102 performing the method 400 of FIG. 4.

At operation 502, the node determines whether the candidate node has deposited a security deposit on the primary blockchain. If the candidate node has not deposited a security deposit on the primary blockchain, the candidate node is not eligible to mine on the primary blockchain (as indicated at operation 504). At operation 506, the node determines whether a record of the security deposit has been confirmed on a secondary blockchain, which is a proof-of-work blockchain. More particularly, the node determines whether a block that includes a record of the deposit has been confirmed (i.e., whether a confirmation period has expired). This determination may be made based on the number of blocks that have been added on top of the block that included the record of the security deposit.

If the record has not been confirmed, then the candidate node is not eligible to mine on the primary blockchain (as indicated at operation 504).

At operation 508, the node determines whether a withdrawal request has been received from the candidate node. A withdrawal request is a request for a return of a security deposit previously transferred to a security deposit account. If a withdrawal request has been received, the candidate node is not eligible to mine on the primary blockchain (as indicated at operation 504).

If the node determines that the candidate node has deposited a security deposit, that the record of the security deposit has been confirmed on the secondary blockchain and that a withdrawal request has not been received, then the candidate node is determined at operation 510 to be eligible to mine on the primary blockchain.

Figure 6:
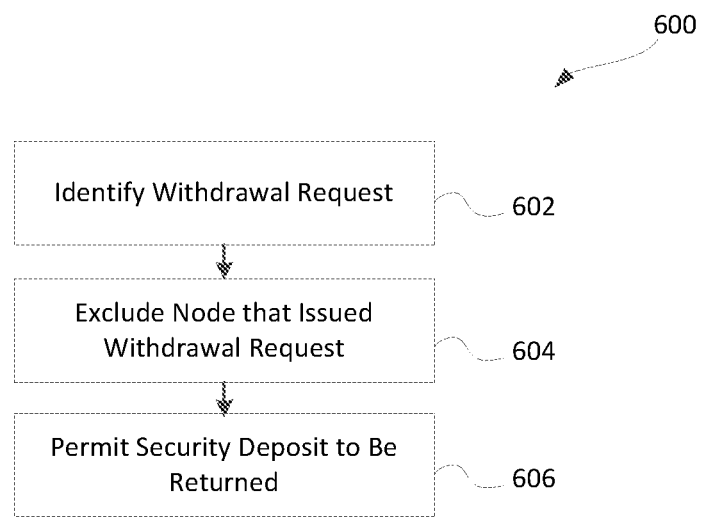
FIG. 6 is a flowchart of an example method of determining whether a candidate node is eligible to participate in the creation of a block.

Referring now to FIG. 6, an example method 600 of processing a withdrawal request is illustrated. The method 600 may be performed by a node of the binary blockchain network 100, such as the node 102 performing the methods 400, 500 of FIGS. 4 and/or 5.

At operation 602, the node 102 performing the method 600 identifies a withdrawal request issued by a node of the binary blockchain network. The withdrawal request is issued by a node that previously transferred a security deposit to a security deposit account on the primary blockchain and is a request for return of the security deposit. The withdrawal request may be detected in a transaction included in a block of the primary blockchain or a transaction included in a block on the secondary blockchain. For example, a transaction may include metadata identifying the transaction as a withdrawal request. Accordingly, the withdrawal request may be identified at operation 602 from metadata of a transaction or record associated with the secondary blockchain, which is the proof-of-work blockchain or the withdrawal request may be identified from metadata of a transaction associated with the primary blockchain.

After the withdrawal request is issued, the node 102 may (at operation 604) exclude the node that issued the withdrawal request from mining on the primary blockchain. That is, the node that issued the withdrawal request is excluded from a group of nodes that are eligible to mine on the primary blockchain. After the withdrawal request is issued, any block of the primary blockchain proposed by the node that issued the withdrawal request is ignored.

After the node performing the method 400 determines that an unbonding period associated with the withdrawal request has elapsed, the node 102, at operation 606, may permit the security deposit associated with the withdrawal request to be returned to the node that issued the withdrawal request. For example, the primary blockchain may be updated to return the security deposit associated with the withdrawal request to the node that issued the withdrawal request. For example, after the unbonding period, the node that issued the withdrawal request may broadcast, to miners of the primary blockchain, a proposed transaction that transfers the security deposit back to a regular address (in other words, renders the security deposit spendable by its owner). Mining nodes and/or validating nodes of the primary blockchain may ensure that the unbonding period has, in fact, elapsed, before allowing the transaction to be included in a block that is added to the primary blockchain. The unbonding period may be a predetermined number of blocks associated with the secondary blockchain. For example, the node issuing the withdrawal request may be required to wait a defined number of blocks before the security deposit is returned.

In some instances, a withdrawal request may be received before the record of the security deposit is confirmed in the secondary blockchain. When this occurs, the node performing the method 400 may wait until the record of the security deposit is confirmed before starting the clock for the unbonding period.

Nodes that are new to the blockchain network (in the sense that they have not previously connected to the blockchain network or that they have been off-line for longer than the unbonding period) may identify a primary and secondary blockchain as a true copy of the primary and secondary blockchain by identifying the secondary blockchain containing the largest amount of work and comparing the distribution of security deposits from the identified secondary blockchain with the distribution of blocks mined in the primary blockchain. If there is more than one primary blockchain, such nodes may select the one such that the distribution matches most closely.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method comprising:
    after a proof-of-stake token is transferred to an address of a determined type on a proof-of-stake blockchain, adding a record of the transfer of the proof-of-stake token to a proof-of-work blockchain;
    identifying a node, from a group of nodes, to participate in adding a block to the proof-of-stake blockchain, the identifying based on the proof-of-work blockchain;
    including the block submitted by the node in the proof-of-stake blockchain; and
    identifying a withdrawal request issued by the node and excluding the node that issued the withdrawal request from the group of nodes;
    wherein the node that sent the withdrawal request broadcasts a proposed transaction that transfers a security deposit to a regular address; and
    identifying a primary blockchain and a secondary blockchain as a true copy of the primary blockchain and the secondary blockchain by identifying the secondary blockchain containing a largest amount of work and comparing a distribution of proof-of-stake tokens from the identified secondary blockchain with a distribution of blocks mined in the primary blockchain.

2. The computer-implemented method of claim 1, wherein identifying the node is performed deterministically according to predetermined criteria such that other nodes of a network identify a common node.

3. The computer-implemented method of claim 1, wherein the identifying is performed using cryptographic sortation.

4. The computer-implemented method of claim 1, wherein the block generates a new token and transfers control of the new token to another node that added the record of the transfer of the proof-of-stake token to the proof-of-work blockchain.

5. The computer-implemented method of claim 1, wherein the block generates a new token and transfers control of the new token to the identified node.

6. The computer-implemented method of claim 1, wherein the withdrawal request is identified from metadata of a transaction associated with the proof-of-work blockchain.

7. The computer-implemented method of claim 1, further comprising, after an unbonding period associated with a withdrawal request, updating the proof-of-stake blockchain to return a proof-of-stake token associated with the withdrawal request to the node that issued the withdrawal request.

8. The computer-implemented method of claim 7, wherein the unbonding period is a predetermined number of blocks associated with the proof-of-work blockchain.

9. The computer-implemented method of claim 1, further comprising:
   rejecting a block submitted by another node that is not the identified node.

10. The computer-implemented method of claim 1, further comprising:
    prior to including the block in the proof-of-stake blockchain, verifying that the block has been validated by a group of validator nodes, the group of validator nodes being a subset of the group of nodes, the validator nodes being identified based on the proof-of-work blockchain.

11. The computer-implemented method of claim 10, wherein the group of validator nodes are configured to perform a byzantine algorithm to validate the block.

12. The computer-implemented method of claim 7, wherein a sender of the withdrawal request broadcasts a proposed transaction that transfers a security deposit to a regular address.

13. A non-transitory computer readable storage medium comprising computer-executable instructions which, when executed, configure a processor to perform the method of claim 1.

14. An electronic device comprising:
    an interface device;
    a processor coupled to the interface device; and
    a memory coupled to the processor, the memory having stored thereon computer executable instructions which, when executed, configure the processor to perform the method of claim 1.

15. The electronic device of claim 14, wherein the memory stores a binary blockchain comprising a proof-of-work blockchain and a proof-of-stake blockchain.

* * * * *